US012352055B2

(12) United States Patent
Bico et al.

(10) Patent No.: US 12,352,055 B2
(45) Date of Patent: Jul. 8, 2025

(54) PNEUMATIC STRUCTURE AND ASSOCIATED PRODUCTION METHOD

(71) Applicants: PARIS SCIENCES ET LETTRES, Paris (FR); ECOLE SUPERIEURE DE PHYSIQUE ET DE CHIMIE INDUSTRIELLES DE LA VILLE DE PARIS, Paris (FR); SORBONNE UNIVERSITÉ, Paris (FR); CENTRE NATIONAL DE LA RECHERCHE SCIENTIFIQUE, Paris (FR); UNIVERSITE PARIS CITE, Paris (FR)

(72) Inventors: José Bico, Paris (FR); Emmanuel Siefert, Lyons (FR); Benoît Roman, Ivry sur Seine (FR); Etienne Reyssat, Antony (FR)

(73) Assignees: PARIS SCIENCES ET LETTRES, Paris (FR); ECOLE SUPERIEURE DE PHYSIQUE ET DE CHIMIE INDUSTRIELLES DE LA VILLE DE PARIS, Paris (FR); SORBONNE UNIVERSITÉ, Paris (FR); CENTRE NATIONAL DE LA RECHERCHE SCIENTIFIQUE, Paris (FR); UNIVERSITE PARIS CITE, Paris (FR)

( * ) Notice: Subject to any disclaimer, the term of this patent is extended or adjusted under 35 U.S.C. 154(b) by 356 days.

(21) Appl. No.: 17/997,766

(22) PCT Filed: May 7, 2021

(86) PCT No.: PCT/EP2021/062171
§ 371 (c)(1),
(2) Date: Nov. 2, 2022

(87) PCT Pub. No.: WO2021/224464
PCT Pub. Date: Nov. 11, 2021

(65) Prior Publication Data

US 2023/0175273 A1 Jun. 8, 2023

(30) Foreign Application Priority Data

May 7, 2020 (FR) ...................................... 2004559

(51) Int. Cl.
*E04G 11/04* (2006.01)
*A47C 27/10* (2006.01)
(Continued)

(52) U.S. Cl.
CPC ............ *E04G 11/045* (2013.01); *A47C 27/10* (2013.01); *A61G 7/05769* (2013.01);
(Continued)

(58) Field of Classification Search
CPC .... A47C 27/10; A61G 7/05769; E04G 11/045
See application file for complete search history.

(56) References Cited

FOREIGN PATENT DOCUMENTS

| | | | |
|---|---|---|---|
| EP | 0044741 | A1 | 1/1982 |
| EP | 0962210 | A2 | 12/1999 |

(Continued)

*Primary Examiner* — James Sanders
(74) *Attorney, Agent, or Firm* — WCF IP

(57) ABSTRACT

The present invention relates to a pneumatic structure (10) comprising an inextensible body (12) defining at least a network of internal cavities (14), each cavity having a closed contour in at least one section of the cavity
Each cavity being suitable for being pressurized so as to change the inextensible body from a rest configuration to at least one pressurized configuration,
Inextensible body having, in each pressurized configuration, a macroscopic metric different from its macroscopic metric in the rest configuration,
Each cavity being formed of at least two substantially rectilinear channels, each channel being fluidly connected to
(Continued)

at least one of the other channels, the two said channels forming a heading change angle,
Each cavity comprising at least one non-zero heading change angle, in particular at least three non-zero heading change angles.

14 Claims, 14 Drawing Sheets

(51) Int. Cl.

| | |
|---|---|
| ***A61G 7/057*** | (2006.01) |
| ***E04H 4/10*** | (2006.01) |
| *E04H 15/20* | (2006.01) |

(52) U.S. Cl.
CPC ....... *E04H 4/103* (2013.01); *E04H 2015/204* (2013.01); *E04H 2015/205* (2013.01); *E04H 2015/206* (2013.01)

(56) References Cited

FOREIGN PATENT DOCUMENTS

| | | | |
|---|---|---|---|
| EP | 1925241 | A1 | 5/2008 |
| FR | 3084010 | A1 | 1/2020 |
| WO | 2018/162715 | A1 | 9/2018 |

PNEUMATIC STRUCTURE AND ASSOCIATED PRODUCTION METHOD

The present invention relates to a pneumatic structure.

The present invention further relates to a manufacturing method for such pneumatic structure.

Such structure is intended for forming three-dimensional objects with a predefined structure; starting from a reference shape, by applying an overpressure inside internal cavities of the structure.

The three-dimensional objects are e.g. biomedical equipment, leisure or rehabilitation equipment, furniture parts, or further, industrial structures.

In many fields, it is desirable to have structures presenting a compact contracted configuration at rest, and occupying during the use thereof, a deployed configuration, wherein the structure has a volume of use and sufficient rigidity for the use thereof.

In certain cases, the structure is pneumatic. The transition from the rest configuration to the deployed configuration is achieved by inflating the structure with a fluid, in particular air.

Traditional three-dimensional pneumatic structures are obtained by the complex assembly of flat membranes by bonding along the periphery thereof, which is a delicate operation, a complex shape involving a large number of parts.

Furthermore, such three-dimensional structures generally are difficult to fold.

Other pneumatic structures are described e.g. in U.S. Pat. No. 9,464,642.

Such structures generally have a plurality of internal channels, which, after inflation, generate substantial deformations of the structure, so that the structure curves, lengthens, contracts, or twists during pressurization. The structures described in U.S. Pat. No. 9,464,642 are used, e.g. as pneumatic actuators. However, during the inflation of the structure, the deformation of the internal cavities is very significant. The deformation generally occurs in only one direction and determines an expansion at the cavities which strongly deforms the structure.

A pneumatic structure made from an inextensible body and thus having no problem of deformation of the material, is also known from U.S. Pat. No. 9,506,455. However, the rigidity of the three-dimensional structures thus obtained is relatively low and thus such structure is only of limited use, such as e.g. supporting a plastic glass or a pen for the structures described in U.S. Pat. No. 9,506,455. Such structures have the same orientation of the channels throughout and thus have a unidirectional curvature.

A goal of the invention is to obtain a pneumatic structure which can be easily activated so as to rapidly change shape and to obtain a controlled and reproducible shape with improved rigidity.

To this end, the subject matter of the invention relates to a pneumatic structure including an inextensible body defining at least one network of internal cavities, every cavity having a closed contour in at least one section of the cavity, every cavity being suitable for being pressurized so as to change the inextensible body from a rest configuration to at least one pressurized configuration, the inextensible body having, in every pressurized configuration, a macroscopic metric distinct from the macroscopic metric thereof in the rest configuration, every cavity consisting of at least two substantially rectilinear channels, every channel being fluidically connected to at least one of the other channels, the two said channels forming a direction changing angle, every cavity comprising at least one non-zero direction changing angle, in particular at least three non-zero direction changing angles.

The structure according to the invention can comprise one or a plurality of the following features, taken individually or according to any technically possible combination:

- the value of the direction changing angle of every channel varies along a cavity;
- every channel has a width, defined laterally along said section and in the rest configuration, less than a third of the length of said channel, in particular less than half the length of said channel;
- at least one cavity comprises a channel which separates into at least two channels;
- at least one cavity is suitable for receiving an overpressure compared to the atmospheric pressure, the inextensible body being in the rest configuration in the absence of overpressure, the inextensible body being in the pressurized configuration when the internal pressure of every cavity is greater than a so-called deployment pressure equal to Young's modulus multiplied by the ratio between the cube of the thickness of the inextensible body and the minimum width of the channels;
- in the rest configuration, the inextensible body has a flat shape, in particular the shape of a flat disk or a rectangle, the pneumatic structure being foldable in the rest configuration;
- in the pressurized configuration, the inextensible body defines an outer shell having a three-dimensional shape, the pneumatic structure having a flexural modulus in the pressurized configuration greater than 100 times the flexural modulus of the pneumatic structure in the rest configuration;
- the pneumatic structure has symmetry with respect to a central axis or with respect to a plane of symmetry in the rest configuration;
- the inextensible body has a periphery in the rest configuration, every cavity extending at the periphery along a direction substantially tangential to the periphery or along a direction substantially orthogonal to the periphery;
- the inextensible body defines at least one opening, the ratio between the surface area of the opening and the surface area of the inextensible body being less than 70%;
- the inextensible body comprises at least two flat layers with similar contours, which are welded together;
- the inextensible body comprises at least three overlaid layers, the inextensible body defining at least a first network of cavities between two successive layers and at least a second network of cavities between two other successive layers, the first network and the second network being advantageously suitable for being pressurized independently of one another, and
- the pneumatic structure forms: a biomedical equipment item, a furniture component, a leisure equipment item, such as a tent or a swimming pool, a tableware equipment item, such as a plate, or an industrial equipment item with adaptable shape, such as a formwork for a concrete structure.

The further subject matter of the invention is a manufacturing method as defined above, comprising at least the following steps:

- providing at least two flat layers with similar shapes,
- arranging the layers on top of each other, and
- welding the layers together in a predefined pattern so as to form the cavities.

The manufacturing method according to the invention can further have one or a plurality of the features below, taken individually or according to all technically conceivable possible combinations:

- the welding step according to the predefined pattern is carried out using a soldering iron, advantageously controlled by a computer;
- the method comprises a step of arranging a release paper between every layer prior to the welding step, the release paper defining the predefined pattern, the step of welding the layers being carried out using a flat heating press, and
- the welding step is carried out by a heating press having the shape of the pattern.

The invention will be better understood upon reading the following description, given only as an example and making reference to the enclosed drawings, wherein.

A first pneumatic structure 10 according to the invention is illustrated schematically in FIGS. 1 to 4.

Figure 1:
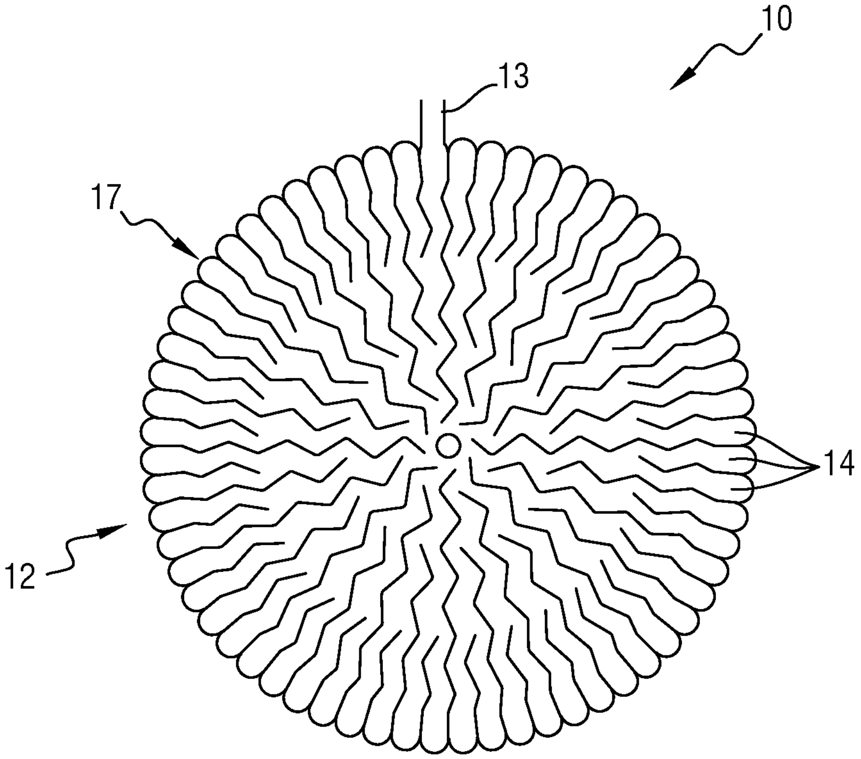
FIG. 1 is a view of a first pneumatic structure according to the invention, in a rest configuration.
Figure 2:
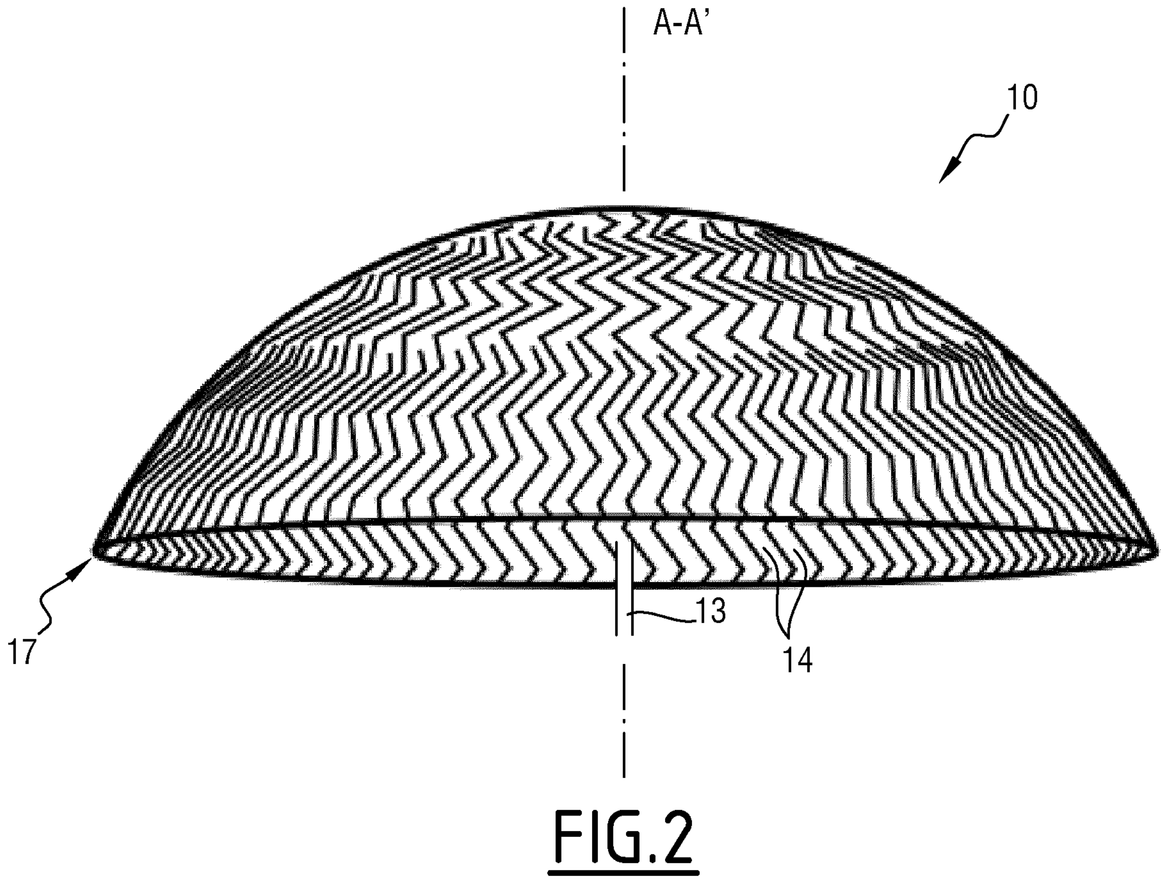
FIG. 2 is in perspective of the first structure of FIG. 1, in a pressurized configuration.

The structure 10 includes an inextensible body 12 internally defining a plurality of internal cavities 14, suitable for being pressurized in order to make the inextensible body 12 change from a rest configuration, shown in FIG. 1, to a pressurized configuration, shown in FIG. 2.

The structure 10 further includes at least one pressurization port 13 communicating with the internal cavities 14 so as to enable the cavities 14 to be pressurized.

As will be described in detail hereinafter, the inextensible body 12 is configured for being deformed, through the structure of the internal cavities 14 same contains, between the rest configuration thereof, which is advantageously flat, and at least one pressurized configuration, wherein same takes a three-dimensional shape, the macroscopic metric of the inextensible body 12 in the pressurized configuration being different from the macroscopic metric of the inextensible body 12 in the rest configuration.

"Macroscopic metric of the inextensible body" refers to all distances separating two different points of the median surface defined within the inextensible body 12 between the upper surface thereof and the lower surface thereof.

Thus, at least certain distances between different points on the median surface varies during the change from the rest configuration to the pressurized configuration.

In every pressurized configuration, the inextensible body 12 has a Gaussian curvature different from the Gaussian curvature in the rest configuration thereof, In particular, with reference to FIGS. 1 and 2, at, at least one point on the median surface, the Gaussian curvature is zero in the rest configuration and is non-zero, e.g. either positive or negative, in the pressurized configuration.

"Gauss curvature" or "Gaussian curvature" refers to the product of the main curvatures at a given point on a surface. As an example, the Gauss curvature of a flat sheet or a sheet rolled into a cone or cylinder is zero. The Gauss curvature is positive for a sphere and negative for a saddle.

"Inextensible body" refers to the fact that the body is not suitable for being elongated by extension when the pressure applied to the body is lower, in particular 10 times lower, advantageously 100 times lower, at a so-called inextensibility pressure equal to the Young's modulus of the body multiplied by the ratio between the thickness of the inextensible body 12 and the maximum width ($\omega$−e) of the cavities 14, defined laterally in a cross-section of the cavity 14, in the rest configuration.

The Young's modulus being measured at 23° C. as per the NFT 46-002 standard.

As an example, the Young's modulus of the material of the inextensible body 12 is equal to about 1 GPA, the thickness of the inextensible body 12 is equal to about 100 μm and the maximum width is about 5 cm. The inextensibility pressure is then equal to 20 bar.

The inextensible body 12 is made e.g. of nylon. In a variant, the inextensible body 12 consists of nylon fabrics impregnated with thermoplastic urethane, polyethylene, polypropylene or polypropylene terephthalate. As a further variant, the inextensible body 12 consists of fabrics of plant origin such as e.g. cotton or linen.

In the example shown in FIG. 1, the inextensible body 12 comprises two flat layers 16 with similar shapes, herein with round shape, welded together.

The cavities 14 are thus defined between the two overlaid layers 16.

In particular, the inextensible body 12 defines at least three cavities 14, in particular at least ten cavities 14.

Figure 3:
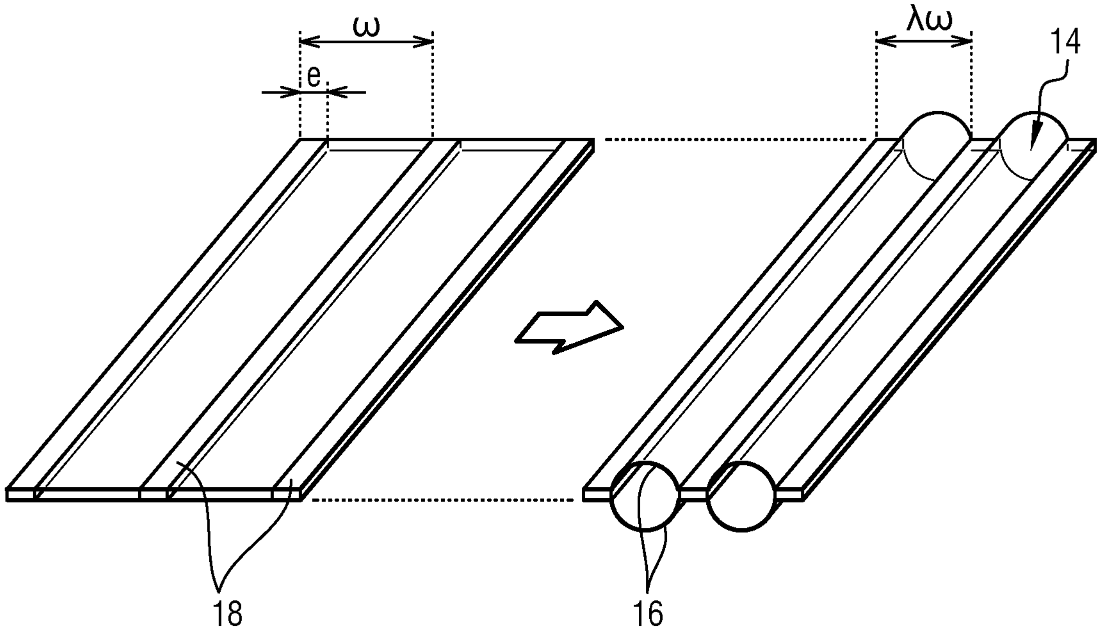
FIG. 3 is a perspective and sectional view of a part of the first structure of FIG. 1 in the rest configuration on the left and in the pressurized configuration on the right.

With reference to FIG. 3, every cavity 14 is laterally delimited, in at least one transverse section of the cavity 14, by two opposite welds 18.

The width e of the welds 18 is typically comprised between 0.1 mm and 100 mm.

Between two welds 18, every cavity 14 is delimited above by an upper region formed by one of the layers 16 and below by a lower region formed by the other layer 16.

Every cavity 14 has a closed contour in said section.

The contour has a flattened shape in the rest configuration, as can be seen on the left in FIG. 3, and an oval shape, herein round, in the pressurized configuration, as can be seen on the right in FIG. 3.

In particular, in the rest configuration, as can be seen on the left in FIG. 3, the two layers 16 are substantially parallel to each other.

In the rest configuration, more than 50%, in particular more than 80%, of the surface area of the upper and lower regions of the layers 16 are in contact with each other.

Thus, in the rest configuration, the thickness of the inextensible body 12 taken opposite a cavity 14 is less than or equal to 200% of the sum of the thicknesses of the opposite layers 16, advantageously less than 105% of the sum of the thicknesses of the opposite layers 16.

The width (ω–e) of the cavity 14 is typically comprised between 1 mm and 2000 mm.

In the pressurized configuration, the thickness of the inextensible body 12 taken opposite a cavity 14, is substantially equal to 2(ω–e)/π.

The cavities 14 of at least one network of cavities 14 are interconnected. In such example, all the cavities 14 are interconnected at the center of the structure 10.

Furthermore, every network of interconnected cavities 14 is connected to a corresponding port 13 for the selective pressurization thereof.

The inextensible body 12 has a periphery 17 in the rest configuration, herein with a generally round shape.

The cavities 14 extend radially from a central axis A-A' of the inextensible body 12 toward the periphery 17.

The structure 10 has herein, a symmetry with respect to the central axis A-A'.

Thus, every cavity 14 has a similar pattern, the structure 10 being formed by the reproduction by rotation about the central axis A-A' of symmetry of said pattern.

Every cavity 14 extends along a direction which is substantially orthogonal to the periphery 17. Thus, at the periphery 17, the tangent to the periphery 17 is orthogonal to the direction of extension of the cavity 14.

Every cavity 14 is sealed along the periphery 17 so as to ensure the sealing of the network of cavities 14, in particular by a seam or a festoon-shaped weld.

As can be seen in FIGS. 1 to 4, every cavity 14 consists of at least two substantially rectilinear channels 19 extending end-to-end.

Every channel 19 has a width (ω–e), defined laterally in a cross-section in the rest configuration, less than one third of the length L of said channel 19, in particular less than half the length L of the channel 19.

Every channel 19 is fluidically connected to at least one of the other channels 19 of the cavity 14, the two said channels 19 forming a direction changing angle χ, χ' at the common end of the channels.

Figure 4:
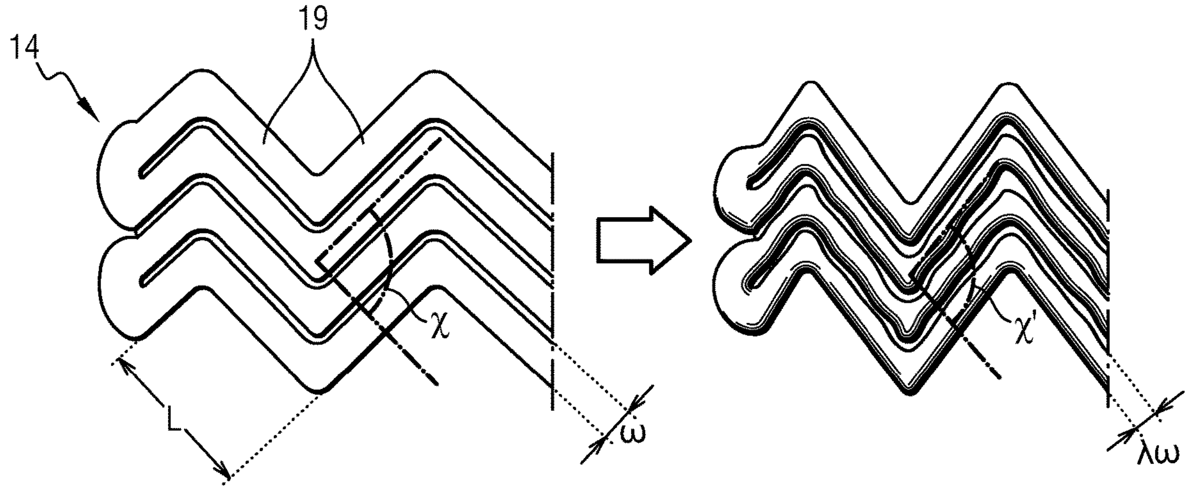
FIG. 4 is an explanatory top view of the direction changing angle, in the rest configuration on the left and in the pressurization configuration on the right.

In particular, as can be seen in FIG. 4, every channel 19 extends in an own direction thereof, two consecutive channels 19 then forming the direction changing angle χ, χ'.

Subsequently, the direction changing angle is associated with the symbol χ in the rest configuration and with the symbol χ' in the pressurized configuration.

As can be seen in FIGS. 1 and 2, every cavity 14 comprises at least one non-zero direction changing angle, in particular at least three non-zero direction changing angles.

In other words, every cavity 14 has the shape of a broken line or in other words, a zigzag.

Every direction changing angle χ, χ' is advantageously comprised between 20° and 160°.

In particular, the value of the direction changing angle χ, χ' of every channel 19 varies along a cavity 14.

Herein, the direction changing angle χ, χ' along a cavity from the periphery 17 towards the center of the structure 10, is an increasing function. Thus, in other words, the zigzag becomes increasingly narrowed toward the center of the structure 10.

At least one cavity 14 comprises a channel 19 separating into at least two channels 19.

In the example shown in FIGS. 1 and 2, starting from the center towards the periphery 17, every channel 19 separates into two channels 19 which each separate again into two channels 19.

The change of the inextensible body 12 from the rest configuration, shown in FIG. 1, to the pressurized configuration, shown in FIG. 2, will now be described in greater detail.

In the rest configuration, the inextensible body 12 has a first macroscopic metric.

In particular, the inextensible body 12 has a flat shape, herein a flat disk shape.

No overpressure is applied to the cavities 14 and, as can be seen on the left in FIG. 3, the contour of every cavity 14 has a flattened shape.

The distance between two welds 18 is then equal to the width (ω–e), as shown on the left in FIG. 3, and every channel 19 has a direction varying angle χ with the adjacent channels 19, as shown on the left in FIG. 4.

In the rest configuration, the structure 10 is foldable, in particular foldable by hand by a human being.

The structure 10 has a flexural rigidity per unit of width equal to the Young's modulus of the material of the inextensible body 12 multiplied by the cube of the thickness of the inextensible body of the [inextensible body] 12. The structure 10 is called foldable, if the flexural rigidity is less than 1 N.m.

As an example, the folding rigidity is less than $10^{-3}$ N.m when the inextensible body 12 has a thickness of about 100 μm and a Young's modulus of about 1 GPa.

In the pressurized configuration, the inextensible body 12 has a second macroscopic metric distinct from the first macroscopic metric.

In particular, the inextensible body 12 defines an outer envelope with a three-dimensional shape, herein a shell shape.

Every cavity 14 is suitable for receiving an overpressure compared to the atmospheric pressure.

In particular, the inextensible body 12 changes to the pressurized configuration thereof when the internal pressure of every cavity 14 is greater than a so-called deployment pressure equal to the Young's modulus multiplied by the ratio between the thickness of the inextensible body and the minimum width of the channels.

When the overpressure is applied to the cavities 14, the contour of every cavity 14 has an oval shape, herein round, as can be seen on the right in FIG. 3.

As a result of the change of the contour from a flattened shape to a round shape, the distance between two welds 18 is then equal to w multiplied by a contraction factor λ, as shown on the right in FIG. 3.

The contraction factor λ is equal to $$\lambda = \frac{2}{\pi}\left(1 - \frac{e}{\omega}\right) + \frac{e}{\omega}.$$

Thus, the smaller the ratio, at rest, between the thickness e of the weld 18 and the width (ω–e) of the channel 14, the narrower becomes the distance between two welds 18 during the change to the pressurized configuration.

Due to such narrowing, every channel 19 then has a direction varying angle χ' with the adjacent channels 19 which is less than the direction varying angle $\chi$ at rest, as shown on the right in FIG. 4.

In particular, the change in the direction varying angle $\chi$, $\chi'$ is given by the formula: $\tan(\chi/2)=\lambda \tan(\chi'/2)$.

Thus, the greater the contraction factor $\lambda$, the more the direction varying angle $\chi$, $\chi'$ increases when changing to the pressurized configuration.

Pressurization produces a stiffening of the structure 10.

The inextensible body 12 in the pressurized configuration is then self-supporting, i.e. same is apt to be maintained as such in the modified metric thereof, against the own weight of the body, without any necessity to provide an external support frame.

In the pressurized configuration, the pneumatic structure 10 has a flexural modulus at least 100 times greater than the flexural modulus of the pneumatic structure 10 in the rest configuration.

Figure 5:
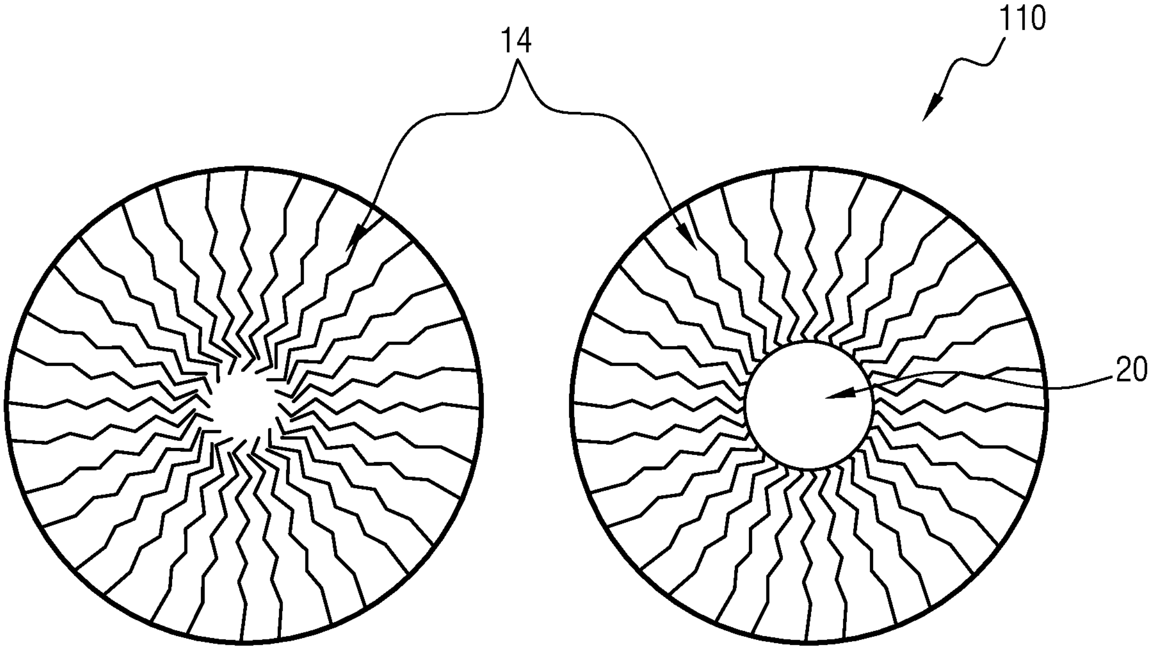
FIG. 5 is a view, from above and from below, of a second pneumatic structure according to the invention, in a rest configuration.
Figure 6:
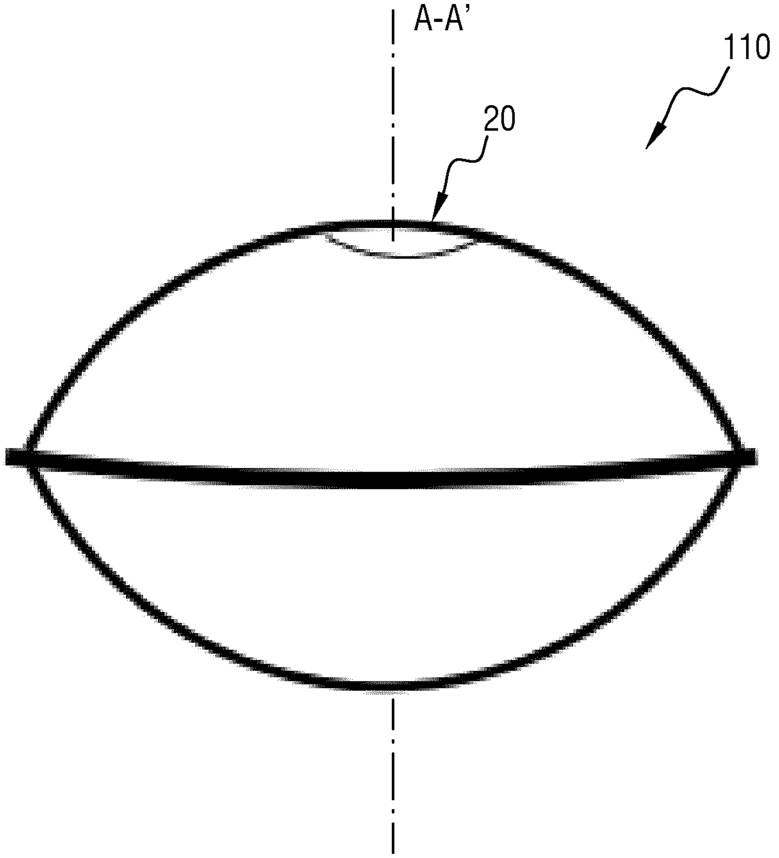
FIG. 6 is a perspective view of the second structure of FIG. 5, in a pressurized configuration.

As a variant, a second pneumatic structure 110 according to the invention is illustrated schematically in FIGS. 5 and 6.

The second structure 110 differs from the first structure 10 in that the inextensible body 12 comprises four overlaid layers 16.

The inextensible body 12 defines a first network of cavities 14 between the two successive first layers 16 and a second network of cavities 14 between the two successive last layers 16.

As can be seen in FIG. 5, the pattern of every network of cavities 14 is similar to the pattern of the first structure 10.

The first network of cavities 14 differs in that an opening 20 is provided on the first two layers 16, at the center of the inextensible body 12.

The ratio between the surface area of the opening 20 and the surface area of the extensible body 12 is less than 70%, in particular less than 50%, advantageously less than 25%.

In the rest configuration, as shown in FIG. 5, the four layers 16 are overlaid on one another and the second structure 110 is foldable.

In the pressurized configuration, as shown in FIG. 6, the inextensible body 12 then takes the shape of a flattened sphere, or in other words a so-called lens shape.

The flattened sphere consists of a shell similar to the shell of the structure 10 formed by the second network of cavities 14 and of a truncated dome formed by the first network of cavities 14.

In an advantageous variant, every cavity network is suitable for being pressurized independently of the other networks. It is thus possible to obtain a plurality of pressurized configurations.

In the first pressurized configuration, the structure 110 has a shell shape similar to the shape shown in FIG. 2.

In the second pressurized configuration, the structure 110 has a truncated dome shape.

Figure 7:
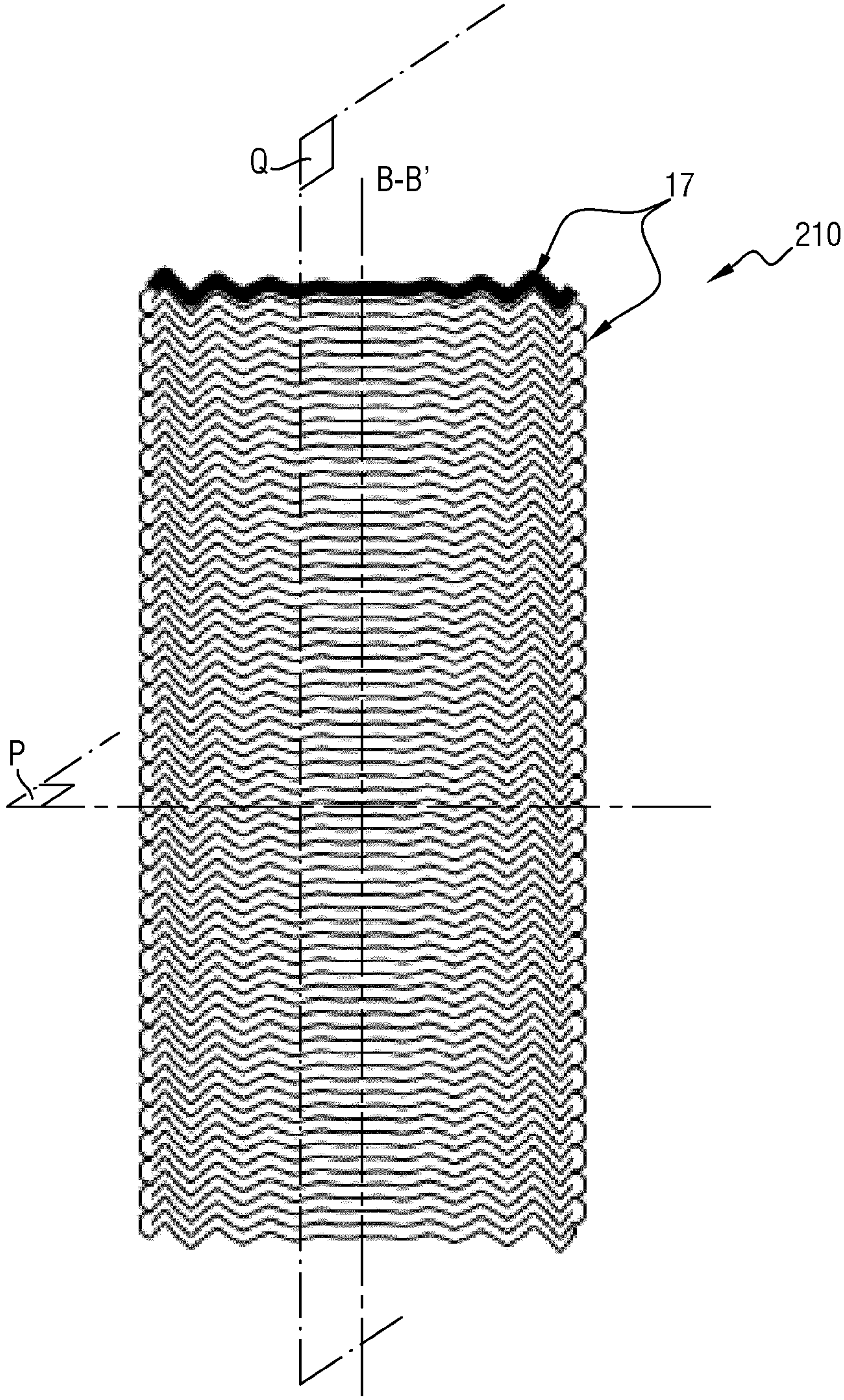
FIG. 7 is a view of a third pneumatic structure according to the invention, in a rest configuration.
Figure 8:
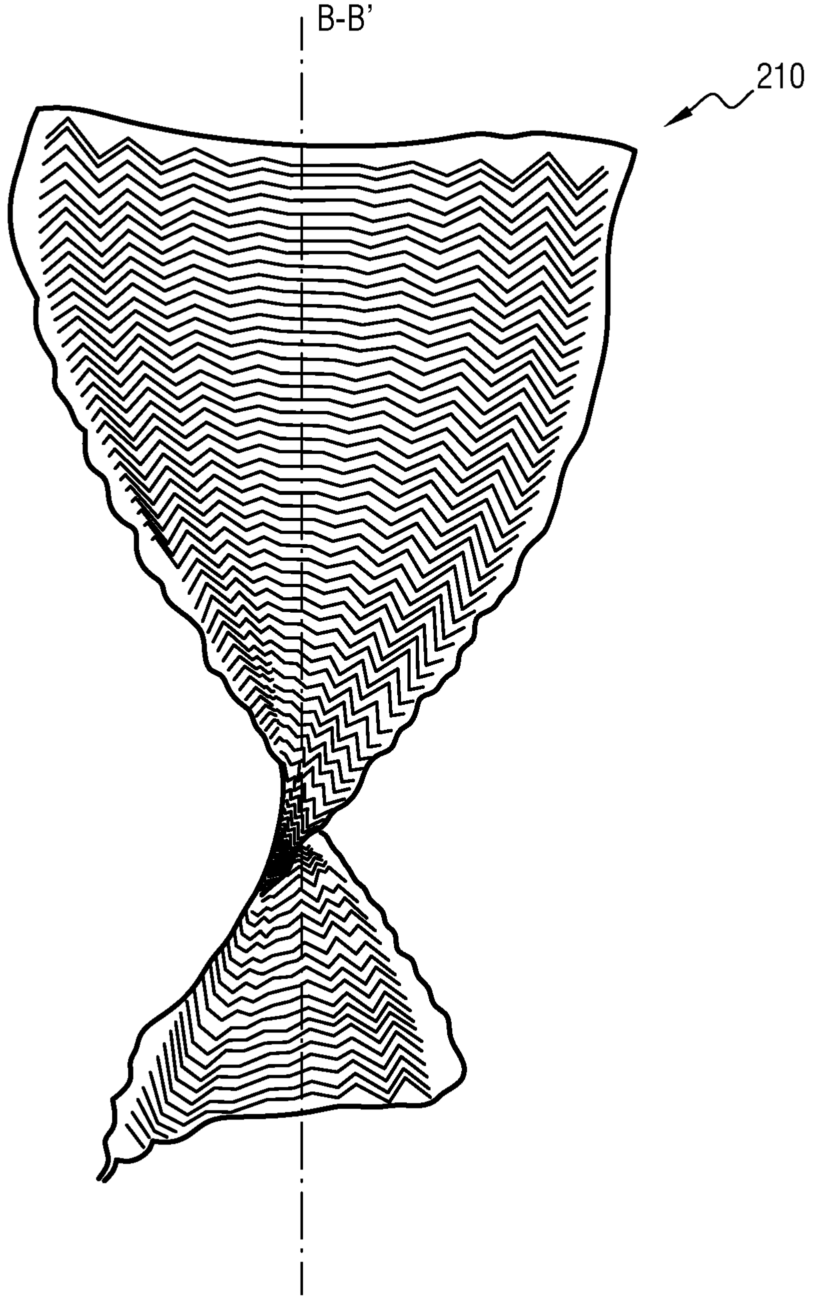
FIG. 8 is a view similar to FIG. 7, in a pressurized configuration.

As a variant, a third pneumatic structure 210 according to the invention is illustrated schematically in FIGS. 7 and 8.

The third structure 210 differs from the first structure 10 in that the inextensible body 12 has a flat rectangular shape in the rest configuration, extending along a main direction B-B'.

The cavities 14 extend parallel to each other perpendicularly to the main direction B-B'.

The inextensible body 12 thus has a symmetry with respect to a plane P, orthogonal to the main direction B-B' and with respect to a plane Q comprising the main direction B-B' and orthogonal, in the rest configuration, to the plane of the structure 210.

The periphery 17 has herein a rectangular shape.

Every cavity 14 extends along a direction which is substantially orthogonal to the periphery 17.

The two cavities 14 arranged at the ends of the inextensible body 12 further extend along a direction substantially tangential to the periphery 17.

As illustrated in FIG. 8, the application of a pressure in the cavities 14 generates a deformation by torsion of the inextensible body 12.

The third structure 210 then has a helix shape in the pressurized configuration.

Figure 9:
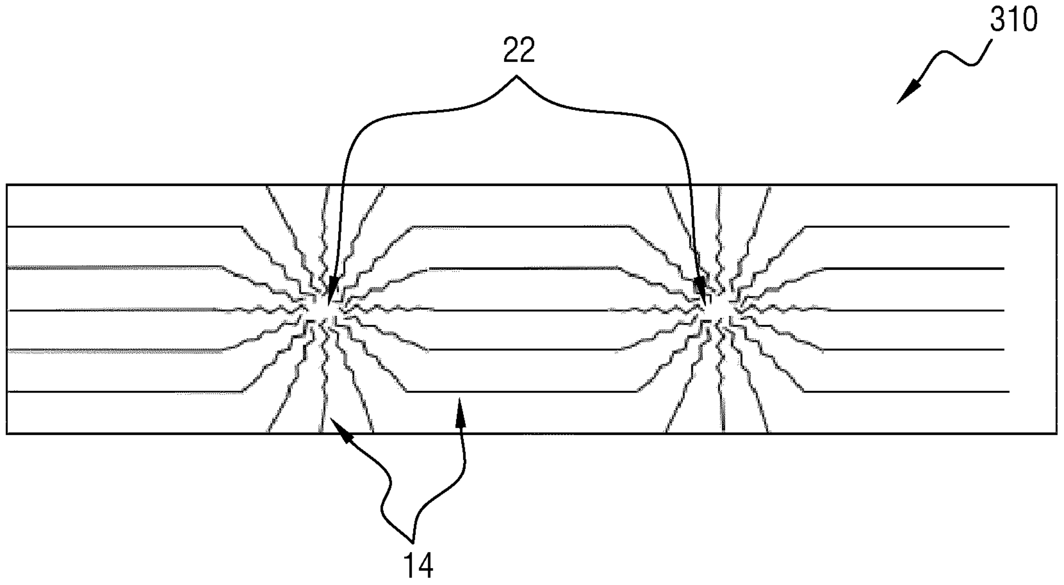
FIG. 9 is a view of a fourth pneumatic structure according to the invention, in a rest configuration.
Figure 10:
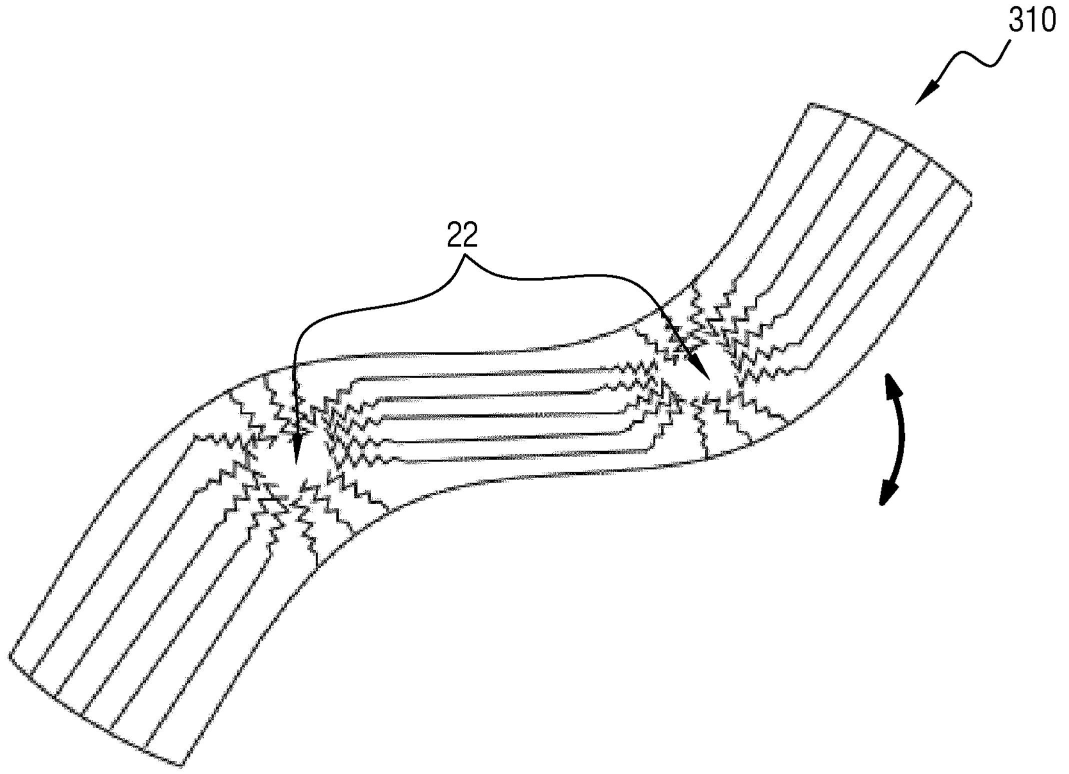
FIG. 10 is a perspective view of the fourth structure of FIG. 9, in a pressurized configuration.

As a variant, a fourth pneumatic structure 310 according to the invention is illustrated schematically in FIGS. 9 and 10.

The fourth structure 310 differs from the third structure 210 in that the pattern of the network of cavities 14 has two foci 22 from which the longitudinal ends of the inextensible body 12 extend radially from the cavities 14.

The foci 22 are connected by cavities 14 which extend longitudinally.

In the pressurized configuration, the contraction of the cavities 14 makes the fourth structure 310 change to a three-dimensional shape.

The three-dimensional shape has two positions. In the first position, as shown in FIG. 10, the three-dimensional shape has a wavy shape with a point of inflection located in-between the two foci 22.

In the second position, not shown, the three-dimensional shape has an arc shape with no point of inflection.

The structure 310 is suitable for changing from one position to the other by exerting a force on one of the ends of the inextensible body 12 in order to rotate said end with respect to the adjacent focus 22, as represented by the arrows in FIG. 10.

Figure 11:
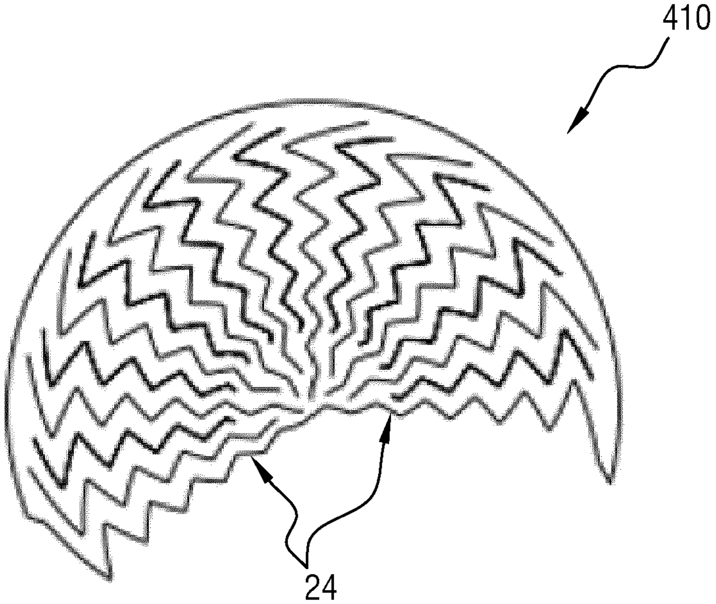
FIG. 11 is a view of a fifth pneumatic structure according to the invention, in a rest configuration.
Figure 12:
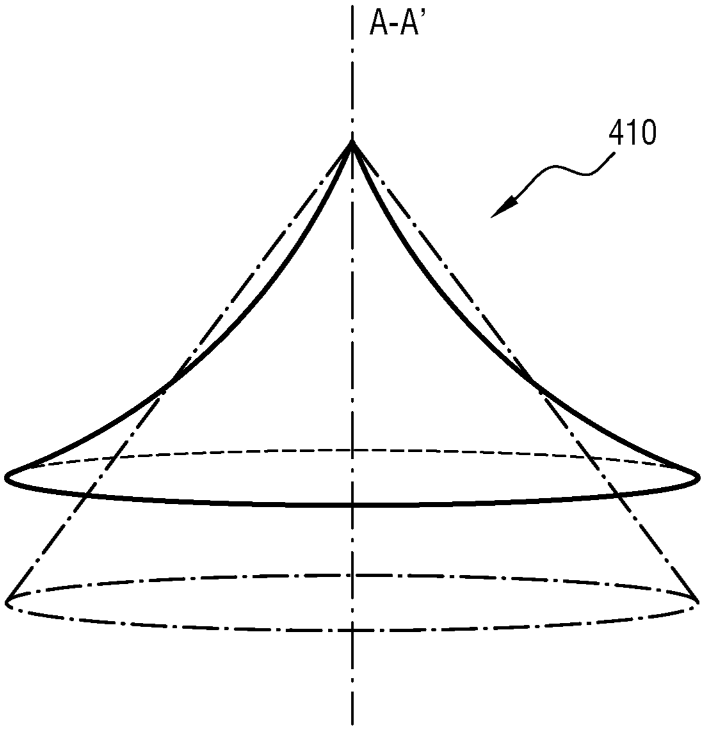
FIG. 12 is a perspective view of the fifth structure of FIG. 11, in a pressurized configuration and in an intermediate configuration.

As a variant, a fifth pneumatic structure 410 according to the invention is illustrated schematically in FIGS. 11 and 12.

The fifth structure 410 differs from the first structure 10 in that the inextensible body 12 has the shape of a disk sector extending over an angular extent comprised between 0° and 360°, defined between two edges 24 extending from the center of the inextensible body 12.

The inextensible body 12 is configured for changing from the rest configuration, as shown in FIG. 11, to the pressurized configuration, as shown as a solid line in FIG. 12, going through an intermediate configuration, as shown as dashed lines in FIG. 12.

The intermediate configuration is obtained from the rest configuration by bringing closer together and fastening the two edges 24.

The two edges 24 are fastening together by means of fastening, such as hooks or an adhesive tape.

The intermediate configuration thus has a three-dimensional shape without any overpressure being applied in the cavities 14.

Herein, the inextensible body 12 has the shape of a cone of revolution, as shown as dotted lines in FIG. 12.

The change from the intermediate configuration to the pressurized configuration is obtained by pressurizing the cavities 14, thus leading to the contraction of the cavities 14.

The inextensible body 12 then has the shape of a concave cone, or in other words of a horn, as shown in solid lines in FIG. 12.

In a variant (not shown), a sixth structure differs from the first structure 10 in that the inextensible body 12 has two pressurized configurations.

In particular, the inextensible body 12 defines two networks of cavities 14 separated between the two layers 16, each comprising a corresponding port 13 for every network.

Every network of cavities 14 has a different respective pattern.

Thus, the inextensible body 12 is able to change from the rest configuration to a first configuration which is pressurized by pressurizing the first network of cavities 14, no overpressure being applied in the second network. The sixth structure then has a first three-dimensional shape, e.g. a shell shape as shown in FIG. 2.

The inextensible body 12 is further suitable for changing from the rest configuration to a second configuration which is pressurized by pressurizing the second network of cavities 14, no overpressure being applied in the first network. The sixth structure then has a second three-dimensional shape, different from the first shape, e.g. a cone shape.

In one application of the structure 10, 110, 210, 310, 410, the shapes and dimensions of the inextensible body 12 in the rest configuration and in each of the pressurized configurations are chosen e.g. so that the structure 10, 110, 210, 310, 410 forms a biomedical equipment item, in particular a deployable endoprosthesis, or an actuator for manipulating and moving biological tissue. In such case, the material of the inextensible body 12 is biocompatible.

As a variant, the structure 10, 110, 210, 310, 410 forms a sports and rehabilitation equipment item. The structure 10, 110, 210, 310, 410 e.g. forms an assistance system for bodybuilding or rehabilitation, with an adjustable shape. As a variant, the structure 10, 110, 210, 310, 410 forms a deployable inflatable structure for haute couture, aeronautics or for an outdoor activity, such as tents, bowls or other accessories.

When the structure forms a tent, the structure comprises e.g. an opening 20 forming a door and an opening 20 forming a window.

In particular, the ratio between the surface area of the opening 20 forming the window and the surface area of the inextensible body 12 is advantageously less than 25%.

The ratio between the surface area of the opening 20 forming the door and the surface area of the inextensible body 12 is advantageously less than 50%.

The ratio between the surface area of the opening 20 on the roof and the surface area of the inextensible body 12 is advantageously less than 50%.

In yet another variant, the structure 10, 110, 210, 310, 410 forms part of a piece of furniture, e.g. a continuously deformable furniture panel or a hinge which can be pneumatically activated.

In yet another variant, the structure 10, 110, 210, 310, 410 forms an industrial equipment item, having a shape adapted to the use, e.g. a formwork for a concrete structure, a deformable headrest which takes the shape of the skull, or a wind turbine blade of variable shape for optimizing efficiency.

As a further variant, the structure 10, 110, 210, 310, 410 forms an impact-resistant package surrounding a fragile object so as to protect the object.

In yet another variant, the structure 10, 110, 210, 310, 410 forms a thermal or sound insulator.

A first manufacturing method for a structure 10 according to the invention will now be described with reference to FIG. 13.

In an initial step, at least two flat layers 16 of similar shapes are provided. E.g. two layers 16 in the form of disks are provided.

The layers 16 are arranged one on top of the other.

In order to manufacture the above-mentioned structures 10, having a desired shape in the pressurized configuration, it is possible to model the shape and the metric of the structure 10, and the position of the cavities 14, which are needed for obtaining such desired shape and metric.

The shape and corresponding metric of the structure 10 and cavities 14 in the rest configuration are then calculated so as to obtain the position of the welds 18 to be applied according to a predefined pattern.

Thus, the manufacturing method then comprises a step of welding the layers 16 together according to the predefined pattern, in order to form the cavities 14.

Figure 13:
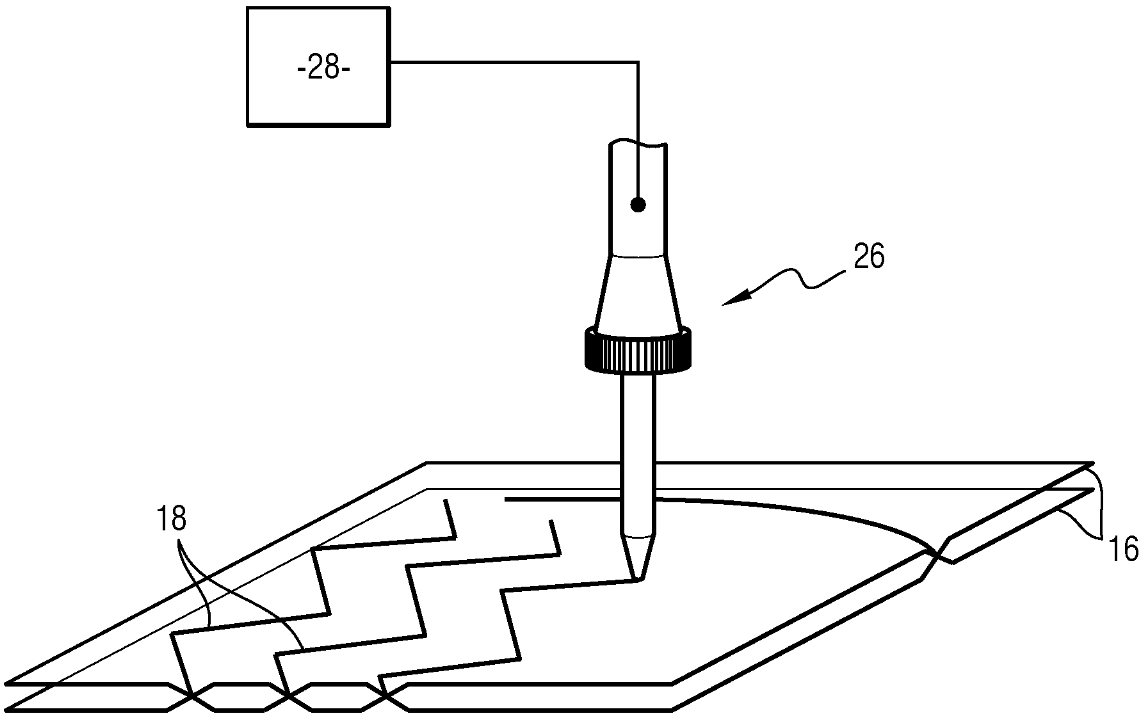
FIG. 13 is a perspective representation of an implementation of a first manufacturing method according to the invention, for the structure shown in FIG. 1.

In particular, the welding step according to the predefined pattern is carried out using a soldering iron 26, as shown in FIG. 13.

The soldering iron 26 is advantageously controlled by a computer 28. The computer 28 comprises a memory wherein the predefined pattern is stored. The computer 28 then controls the movement of the soldering iron 26 according to the predefined pattern.

Alternatively, the soldering iron 26 is handled by an operator.

Figure 14:
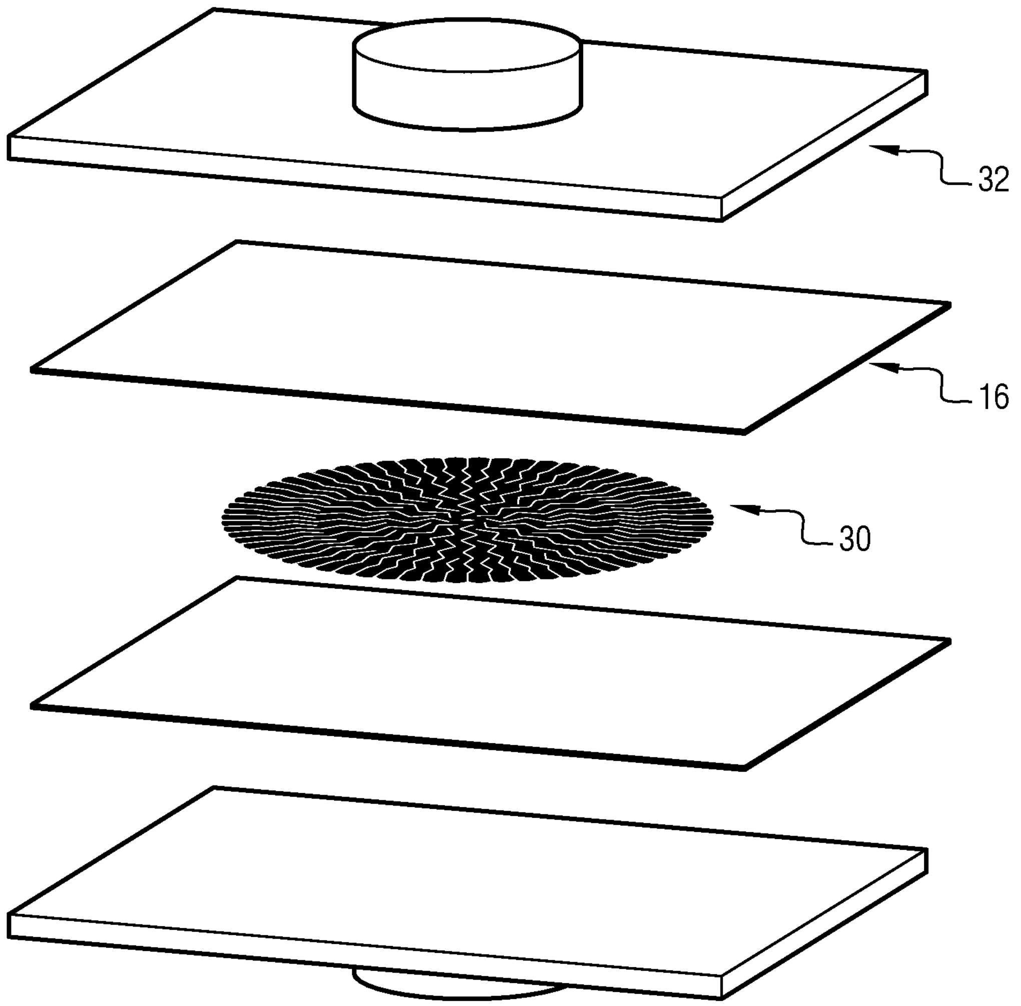
FIG. 14 is a perspective representation of an implementation of a second manufacturing method according to the invention, for the structure shown in FIG. 1.

In a variant, with reference to FIG. 14, a second manufacturing method differs from the first method in that the method comprises a step of arranging, before the welding step, a release paper 30 between every layer 16.

"Anti-adhesive" refers to the fact that the paper has, together with the layers 16, a bonding energy of less than 100 $mJ/m^2$.

The release paper 30 is e.g. greased paper.

The release paper 30 defines the predefined pattern. Thus, the pattern is cut from the release paper 30, only the matching part of the weld pattern being retained.

The step of welding the layers 16 is then carried out using a flat heating press 32.

The welds 18 are then made at the pattern defined by the release paper 30, the release paper 30 preventing the layers 16 from being welded together outside the pattern.

Finally, the method comprises a step of cutting the boundary 17 in order to obtain the structure 10.

In a variant, not shown, a third manufacturing process differs from the first process in that a heating press, the shape of which coincides with the pattern of the desired welds [is used].

The welding step is then carried out using the heating press having the shape of the pattern.

It can be understood that the present invention has a certain number of advantages.

Indeed, the structures 10, 110, 210, 310, 410, according to the invention, are easily deployable and make it possible to achieve shapes predetermined by the pattern of the networks of the cavities 14 contained in the inextensible body 12.

Such deployment makes it possible to easily and quickly change from the rest configuration to at least one pressurized configuration.

In the rest configuration, the inextensible body 12 is foldable or rollable and thus compact and easy to store.

In every pressurized configuration, the inextensibility of the body 12, the small width of the channels 19 compared to the length thereof and the broken line shape of the cavities 14, makes it possible to obtain a structure with a high rigidity.

Furthermore, the structure 10, 110, 210, 310, 410 according to the invention, is easy to manufacture, in a reproducible manner and at a low manufacturing cost.

The invention thus makes possible an advantageous use of the structure 10, 110, 210, 310, 410 in numerous applications such as biomedicine, leisure or industry.

The invention claimed is:

1. A pneumatic structure including an inextensible body defining at least one network of internal cavities, every cavity having a closed contour in at least one section of the cavity, every cavity being suitable for being pressurized so as to change the inextensible body from a rest configuration to at least one pressurized configuration, the inextensible body having, in every pressurized configuration, a macroscopic metric different from the macroscopic metric thereof in the rest configuration, the inextensible body having, in every pressurized configuration, a Gaussian curvature different from the Gaussian curvature in the rest configuration thereof, every cavity being formed from at least two substantially rectilinear channels, every channel being fluidically connected to at least one of the other channels), the two said channels forming a direction changing angle ($\chi$, $\chi'$) at the common end of the channels, every cavity comprising at least one non-zero direction changing angle ($\chi$, $\chi'$).

2. The pneumatic structure according to claim 1, wherein the Gaussian curvature is zero in the rest configuration and is non-zero in the pressurized configuration.

3. The pneumatic structure according to claim 1, wherein the value of the direction changing angle ($\chi$, $\chi'$) of every channel varies along a cavity.

4. The pneumatic structure according to claim 1, wherein every channel has a width ($\omega$−e), defined laterally in said channel and in the rest configuration, less than one third of the length (L) of said channel.

5. The pneumatic structure of claim 1, wherein at least one cavity comprises a channel separating into at least two channels.

6. The pneumatic structure according to claim 1, wherein at least one cavity is suitable for receiving an overpressure compared to the atmospheric pressure, the inextensible body being in the rest configuration in the absence of overpressure, the inextensible body being in the pressurized configuration when the internal pressure of every cavity is greater than a deployment pressure equal to the Young's modulus multiplied by the ratio to the cube between the thickness of the inextensible body and the minimum width ($\omega$−e) of the channels.

7. The pneumatic structure according to claim 1, wherein, in the rest configuration, the inextensible body has a flat shape, that is a flat disk or a rectangle, the pneumatic structure being foldable in said rest configuration.

8. The pneumatic structure of claim 1, wherein, in the pressurized configuration, the inextensible body defines an outer shell having a three-dimensional shape, the pneumatic structure having a flexural modulus in the pressurized configuration greater than 100 times the flexural modulus of the pneumatic structure in the rest configuration.

9. The pneumatic structure according to claim 1, wherein the pneumatic structure has a symmetry with respect to a central axis or with respect to a plane of symmetry in the rest configuration.

10. The pneumatic structure according to claim 1, wherein the inextensible body has a periphery in the rest configuration, every cavity extending peripherally, along a direction substantially tangential to the periphery or along a direction substantially orthogonal to the periphery.

11. The pneumatic structure of claim 1, wherein the inextensible body defines at least one opening, the ratio between the surface area of the opening and the surface area of the inextensible body being less than 70%.

12. The pneumatic structure according to claim 1, wherein the inextensible body comprises at least two flat layers with similar contours and welded together.

13. The pneumatic structure according to claim 11, wherein the inextensible body comprises at least three overlaid layers, the inextensible body defining at least a first network of cavities between two successive layers and at least a second network of cavities between two other successive layers, the first network and the second network being advantageously suitable for being pressurized independently of one another.

14. The pneumatic structure of claim 1, forming wherein the pneumatic structure is part of:

a biomedical equipment item, a furniture component, a leisure equipment item, a tent or a swimming pool, a tableware equipment item, a plate, or an industrial equipment item with adaptable shape, or a formwork for a concrete structure.

* * * * *